(12) United States Patent
Belandia et al.

(10) Patent No.: US 8,573,840 B2
(45) Date of Patent: Nov. 5, 2013

(54) WIRELESS TEMPERATURE SENSOR

(75) Inventors: Aritz Ubarretxena Belandia, San Sebastian (ES); Roc Berenguer—Pérez, San Sebastian (ES); César Matinez Antón, San Sebastian (ES); Daniel Egurrola López, San Sebastian (ES); Javier Hernández de Miguel, San Sebastian (ES)

(73) Assignee: Incide, S.A. (ES)

( * ) Notice: Subject to any disclaimer, the term of this patent is extended or adjusted under 35 U.S.C. 154(b) by 1055 days.

(21) Appl. No.: 12/444,626

(22) PCT Filed: Oct. 9, 2006

(86) PCT No.: PCT/ES2006/000562
§ 371 (c)(1),
(2), (4) Date: Oct. 16, 2009

(87) PCT Pub. No.: WO2008/043861
PCT Pub. Date: Apr. 17, 2008

(65) Prior Publication Data
US 2010/0040191 A1    Feb. 18, 2010

(51) Int. Cl.
*G01K 7/00* (2006.01)
*G01K 1/00* (2006.01)

(52) U.S. Cl.
USPC ........ 374/170; 377/25; 702/130; 340/870.17; 374/141; 374/117

(58) Field of Classification Search
USPC ............. 374/170, 120, 100, 1, 117–119, 141, 374/45; 340/870.17; 377/25, 118, 94, 114; 327/172, 142, 512, 513; 324/76.54, 324/601, 76.55; 331/176
See application file for complete search history.

(56) References Cited

U.S. PATENT DOCUMENTS 3,475,742 A * 10/1969 Whitney et al. .......... 340/870.17
3,700,888 A * 10/1972 Thompson ................ 246/169 D
(Continued)

FOREIGN PATENT DOCUMENTS

EP   0 999 435    5/2000
GB   2 133 160    7/1984
(Continued)

OTHER PUBLICATIONS

Szekely, V., et al. " CMOS Sensors for On-Line Thermal Monitoring of VLSI Circuits."*IEEE Transactions on Very Large Scale Integration (VLSI) Systems* (1997) vol. 5, No. 3, pp. 270-276.

(Continued)

*Primary Examiner* — Gail Verbitsky
(74) *Attorney, Agent, or Firm* — Cantor Colburn LLP

(57) ABSTRACT

The invention relates to an integrated temperature sensor (1) comprising: means (2000) for generating a pulse train (DATA_IN) at an oscillation frequency, means (3000) for counting the number of pulses during a fixed period of time independent of a temperature to be measured (T) and for generating a plurality of bits ($b_{11}, b_{10}, \ldots, b_0$) indicating the number of pulses in the pulse train (DATA_IN), and means (4000) for generating a serial digital signal (DATA_OUT) from said bits ($b_{11}, b_{10}, \ldots, b_0$), in which the means (2000) for generating a pulse train (DATA_IN) include a plurality of logic gates (2410, 2420, 2430, 2440, 2450) which can introduce a delay dependent on the temperature to be measured (T), said means (2000) generating a pulse train (DATA_IN) the oscillation frequency of which is dependent on said temperature to be measured (T). The invention also relates to a temperature measurement method and to a transponder for a wireless system.

21 Claims, 14 Drawing Sheets

(56) References Cited

U.S. PATENT DOCUMENTS

| | | | | |
|---|---|---|---|---|
| 3,798,424 | A * | 3/1974 | Freitas et al. | 700/9 |
| 3,872,728 | A * | 3/1975 | Joyce et al. | 374/170 |
| 4,362,094 | A * | 12/1982 | Polster | 99/342 |
| 4,518,839 | A * | 5/1985 | Taguchi et al. | 219/713 |
| 4,537,518 | A * | 8/1985 | Murase | 374/188 |
| 4,563,748 | A * | 1/1986 | Hanaoka | 702/133 |
| 4,602,871 | A * | 7/1986 | Hanaoka | 374/102 |
| 4,607,247 | A * | 8/1986 | Sterling et al. | 340/538.11 |
| 4,648,055 | A * | 3/1987 | Ishizaka et al. | 702/131 |
| 4,658,407 | A * | 4/1987 | Iwama | 377/25 |
| 4,970,648 | A * | 11/1990 | Capots | 701/14 |
| 5,552,999 | A * | 9/1996 | Polgreen et al. | 702/63 |
| 6,034,558 | A * | 3/2000 | Vanderschoot et al. | 327/277 |
| 6,115,441 | A | 9/2000 | Douglass et al. | |
| 6,412,977 | B1 * | 7/2002 | Black et al. | 374/178 |
| 6,806,698 | B2 * | 10/2004 | Gauthier et al. | 324/76.41 |
| 7,573,340 | B2 * | 8/2009 | Lee | 331/66 |
| 7,581,882 | B2 * | 9/2009 | Noguchi | 374/178 |
| 7,619,486 | B1 * | 11/2009 | Lesea | 331/176 |
| 2001/0004236 | A1 * | 6/2001 | Letkomiller et al. | 340/572.1 |
| 2005/0135456 | A1 | 6/2005 | Lee et al. | |
| 2008/0136453 | A1 * | 6/2008 | Kuo et al. | 326/93 |
| 2008/0214949 | A1 * | 9/2008 | Stivoric et al. | 600/549 |
| 2009/0174586 | A1 * | 7/2009 | Muenter et al. | 341/131 |
| 2011/0080200 | A1 * | 4/2011 | Zhou | 327/172 |

FOREIGN PATENT DOCUMENTS

| | | |
|---|---|---|
| JP | 55-50584 U | 4/1980 |
| JP | 55-50584 Y2 | 11/1980 |
| JP | 57-70417 A | 4/1982 |
| JP | 63-18691 B2 | 4/1988 |
| JP | 8-23511 B2 | 3/1996 |
| JP | 8-23511 A | 8/1996 |
| JP | 9-159547 A | 6/1997 |
| JP | 63-18691 A | 1/1998 |

OTHER PUBLICATIONS

Office Action dated Jun. 26, 2012 issued by the Japanese Patent Office for Application No. 2009-531864.
Espacenet English abstract of JP 8-23511 B2.
Espacenet English abstract of JP 63-18691 B2.
Espacenet English abstract of JP 57-74017 A.
Office Action dated Nov. 8, 2011 issued by the Japanese Patent Office for Application No. 2009-531864.
Espacenet English abstract of JP 8-23511 A.
Espacenet English abstract of JP 9-159547 A.

* cited by examiner

US 8,573,840 B2

WIRELESS TEMPERATURE SENSOR

FIELD OF THE INVENTION

The present invention relates to the field of integrated temperature sensors, and more specifically, to those with a low cost and consumption, as well as to the field of wireless transponders incorporating the sensors.

BACKGROUND OF THE INVENTION

Integrated circuits with a minimalist design in relation to the power consumption thereof are known. The origin of this trend is the extensive growth of those applications in which energy consumption is crucial, such as RFID (Radio Frequency Identification) transponders, wireless sensors, etc.

Most of these circuits have a battery with a very limited energy capacity (active circuits) and the rest of the circuits collect and temporarily store the energy from a radiant source for the correct operation thereof (passive circuits).

Therefore in both of the circuits it is desirable to have low power consumption.

Patent application US 2005/0135456 A1 describes a radio frequency temperature sensor comprising an oscillator generating a signal the frequency of which depends on the temperature. This is achieved through the delay caused by a thermal resistor and a capacitor.

However, the temperature sensor described in US 2005/0135456 A1 has a series of drawbacks, such as the need for a large amount of surface area to integrate the RC (resistor and capacitor) resonant tank, as well as the difficulty of adapting this core (RC) according to the desired temperature variation range.

SUMMARY OF THE INVENTION

The present invention solves the aforementioned problems by means of an integrated temperature sensor with a low cost and consumption valid for the mentioned types of applications (RFID sensors or, more generally, wireless sensors). The sensor of the present invention comprises an oscillator generating a signal the frequency of which depends on the temperature, in which the dependence is achieved through the delay caused by a chain of a certain number of logic gates. A simple adaptation to the desired temperature variation range, which can be easily carried out by the direct scaling of the logic gates (since the total surface area is virtually invariable) against the total redesign required by the same action for sensors based on RC tanks, is thus achieved.

In one aspect of the present invention, an integrated temperature sensor with a low cost and consumption valid for an active, semiactive or passive RFID transponder is provided.

The sensor comprises means for generating a pulse train at a certain oscillation frequency; means for counting the number of pulses of the pulse train during a fixed time which is independent of a temperature to be measured (T) and for generating a plurality of bits indicating the number of pulses comprised in the pulse train; and means for generating a serial digital signal, preferably a parallel-to-serial converter, from the plurality of bits. The means for generating a pulse train comprise a plurality of logic gates, preferably an odd number of negated logic gates, which are capable of introducing a delay dependent on the temperature to be measured, the means thus generating a pulse train the oscillation frequency of which is dependent on the temperature to be measured.

The sensor preferably further comprises control means for coordinating the rest of the means of the sensor using at least one reference signal independent of the temperature to be measured, and more preferably, a second initialization signal.

The pulse train is furthermore generated by a ring oscillator from a reference signal independent of the temperature to be measured.

The means for generating a pulse train preferably comprise a power supply voltage activation and deactivation circuit; a current source, which preferably comprises means for protecting the pulse generator from variations of the power supply voltage; a startup circuit for the current source; and a pulse generator.

The temperature-dependent delay which is introduced by the logic gates is due to the fact that when the temperature increases, the mobility of electrons and holes of the transistors forming the logic gates decreases, whereas when the temperature decreases, the mobility increases.

The sensor is manufactured on a substrate which is chosen from among: silicon, silicon on insulator (SOI), silicon-germanium, indium phosphide and gallium arsenide.

In another aspect of the present invention, a transponder for a wireless temperature identification system is provided comprising: means for storing a unique identification code for the transponder; an antenna capable of receiving a temperature request signal from a reader and transmit to the reader a signal representing the measured temperature; an integrated temperature sensor.

Another aspect of the present invention relates to a wireless temperature identification system comprising: at least one reader which is capable of transmitting a temperature request signal through an antenna and receiving through that antenna a signal representing a measured temperature; and at least one transponder. The system is preferably a radio frequency identification (RFID) system.

The present invention likewise provides a temperature measurement method comprising the following steps: generating a pulse train at a certain oscillation frequency; counting the number of pulses of the pulse train during a fixed time independent of the temperature to be measured and generating a plurality of bits indicating the number of pulses comprised in the pulse train; generating a serial digital signal from the plurality of bits; wherein the pulse train is generated by means of an oscillator comprising a plurality of logic gates which are capable of introducing a delay dependent on the temperature to be measured, the oscillation frequency of the pulse train being dependent on the temperature to be measured.

Finally, the present invention relates to a calibration method for an integrated temperature sensor.

In the context of the present invention, the term "approximately" must be understood as indicating values very close to those accompanied by the term. The person skilled in the art will understand that a small deviation from the indicated values, within reasonable terms, is inevitable due to measurement imprecision, etc.

Throughout this specification, the term "comprises" and derivatives thereof must not be interpreted in an excluding or limiting sense, i.e., it must not be interpreted in the sense of excluding the possibility of the element or concept which it refers to including additional elements or steps.

DESCRIPTION OF THE DRAWINGS

To complement the description which is being made and with the aim of aiding to better understand the features of the invention according to a preferred practical embodiment thereof, a set of drawings is attached as an integral part of the description, in which the following has been depicted with an illustrative and non-limiting character.

DETAILED DESCRIPTION OF THE INVENTION

Figure 1:
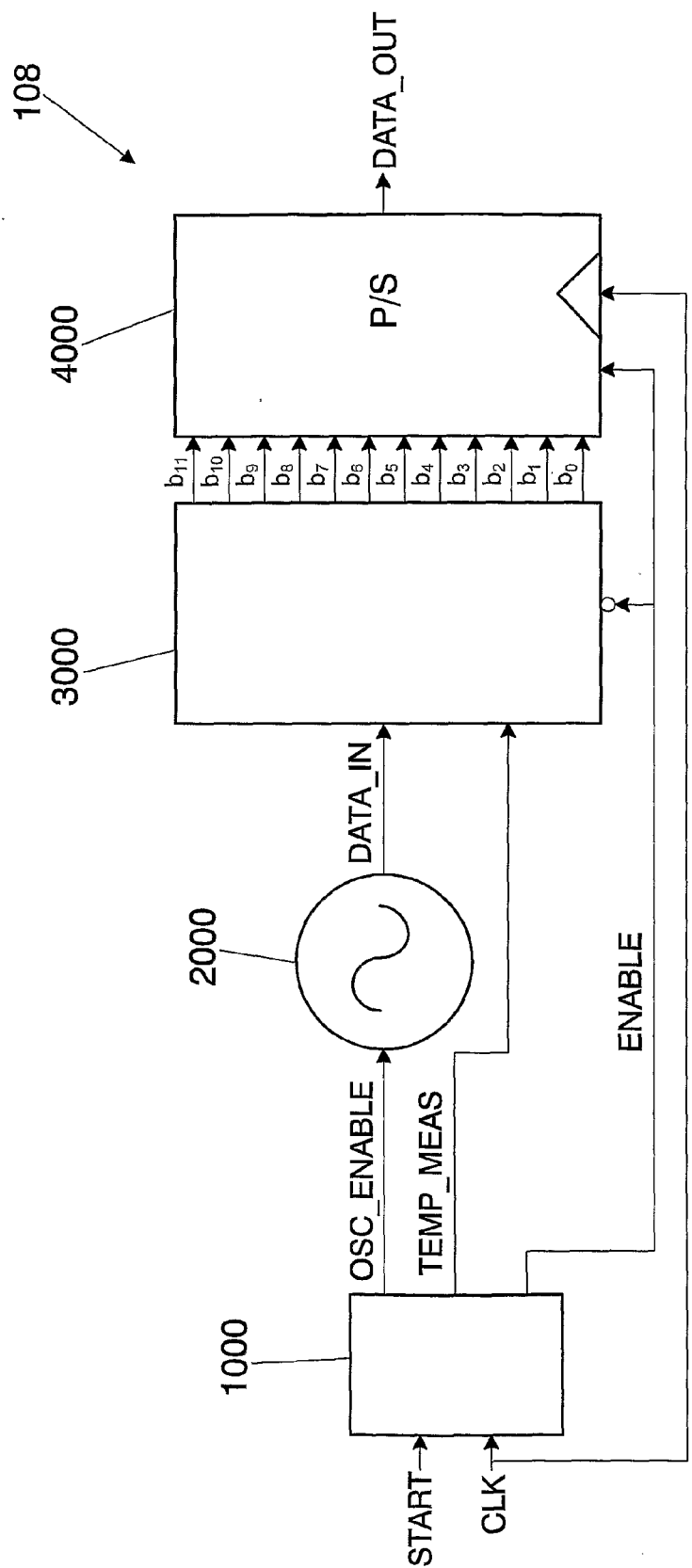
FIG. 1 depicts a general block diagram of the sensor according to one embodiment of the present invention.

FIG. 1 depicts the block diagram of the temperature sensor 108 according to one embodiment of the present invention. The temperature sensor 108 of FIG. 1 can be implemented in a RFID (radio frequency identification) transponder or in any other wireless transponder in general.

The sensor 108 of FIG. 1 comprises an oscillator 2000, a binary counter 3000 and means for generating a serial digital signal 4000. The sensor 108 preferably further comprises control means 1000.

FIG. 1 shows the control means by means of a control logic block 1000, a temperature-dependent oscillator 2000, a binary counter 3000 and a parallel-to-serial converter 4000. In this embodiment of the present invention, the inputs to the sensor 108 are START and CLK. The first one (START) is a step signal used to initiate the measurement process of the sensor 108. Specifically, the start-up of the sensor 108 occurs with the rising flank of the signal "START". The second one is the clock signal (CLK) used for generating the logic control signals and for controlling the correct operation of the (parallel-to-serial converter) digital block 4000. This clock signal (CLK) is generated by the extraction of the signal from a reader incident on a transponder and does not have any thermal dependence, i.e., the frequency of the clock does not vary with the temperature. Both the reader and the transponder are described below. The output of the sensor 108 is given by the signal DATA_OUT, which is the serial digital representation of a number of bits of the temperature measurement. In a particular embodiment, this output is formed by 12 bits, but the present invention is not limited to this specific number of bits. Each of these blocks is described in detail below.

Figure 2:
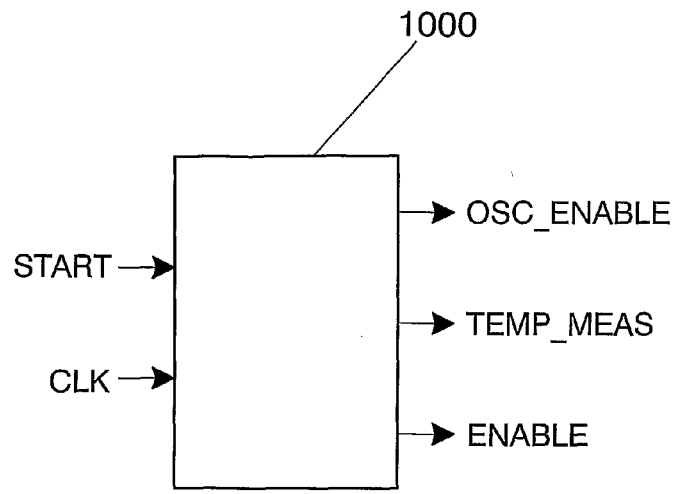
FIG. 2 depicts the block diagram of the highest hierarchical level of the control logic of the sensor according to one embodiment of the present invention.

FIG. 2 depicts the control means or control logic block 1000 with its inputs and outputs. This block 1000 is in charge of generating the digital signals (pulses in '1' during a certain time) necessary for the correct coordination of the rest of the modules of the sensor 108. This is achieved from at least one reference signal (CLK) independent of the temperature to be measured (T). The digital signals generated by the block 1000 are: OSC_ENABLE, TEMP_MEAS and ENABLE. The signal OSC_ENABLE controls the beginning (with its rising flank) and end (with its falling flank) of the operation of the oscillator 2000 of FIG. 1. Specifically, the width of this pulse determines the time during which the oscillator 2000 generates a pulse train in its output. In relation to the signal TEMP_MEAS, its width determines the time during which the pulses delivered by the output pulse train of the generator 2000 are counted in the binary counter 3000 of FIG. 1. On the other hand, the pulse TEMP_MEAS is comprised (smaller width) in the pulse OSC_ENABLE, thus preventing pulses from being counted at the beginning and end of the pulse train (start-up and stop of the oscillator), transient regions affecting the oscillation frequency of the pulse train. Finally, the width of the pulse ENABLE defines the time during which the sensor 108 operates from when the temperature measurement process starts until the binary counter 3000 of FIG. 1 delivers a word (for example, of 12 bits) in parallel as a digital representation of the measurement of the temperature (T) to be measured. The control logic block 1000 comprises several sub-blocks which in turn preferably comprise D-type flip-flops; inverting logic gates; AND logic gates; OR logic gates and NOR logic gates.

Figure 3:
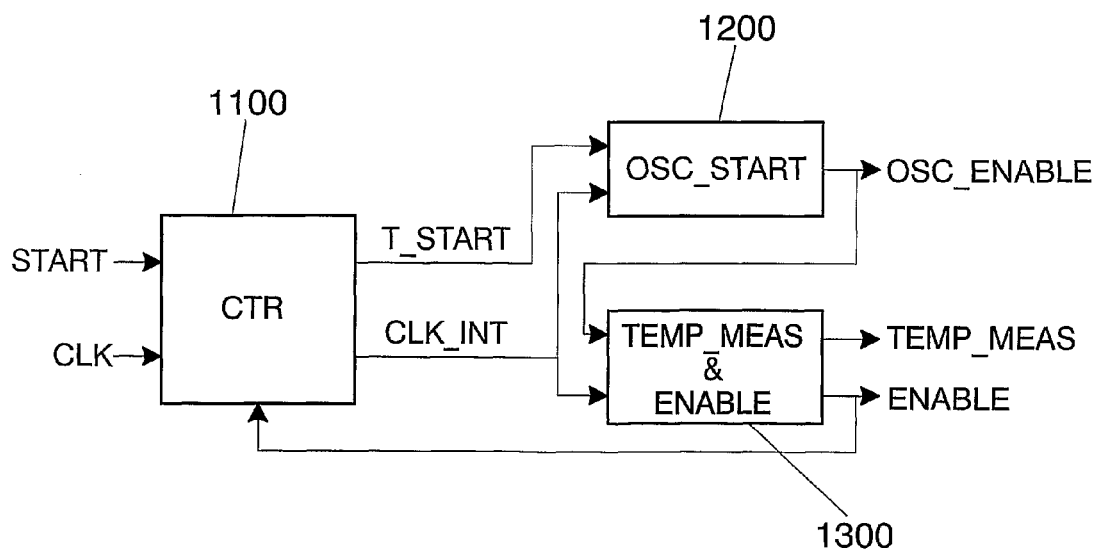
FIG. 3 depicts the block diagram of the next hierarchical level of the control logic, comprising three blocks: "CTR", "OSC_START" and "TEMP_MEAS & ENABLE".

FIG. 3 depicts the internal block diagram of block 1000 (Control Logic) and preferably comprises the CTR 1100, OSC_START 1200 and TEMP_MEAS & ENABLE 1300 blocks. The CTR block 1100 generates two modified versions (T_START and CLK_INT) of the input signals START and CLK, respectively, which serve as an input for the OSC_START 1200 and TEMP_MEAS & ENABLE 1300 blocks. The block 1200 generates the output signal OSC_ENABLE, which in turn serves as an input for the block 1300. The latter block generates the output signals TEMP_MEAS and ENABLE, the latter serving in turn as an input signal for the block 1100.

Figure 4:
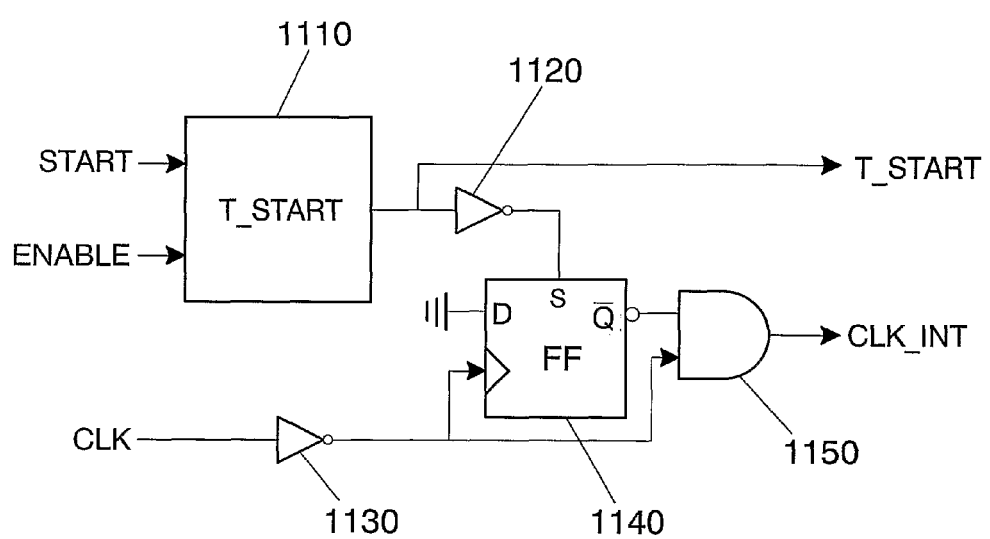
FIG. 4 depicts the block diagram of the next hierarchical level of the "CTR" block of the control logic of FIG. 3.

FIG. 4 shows the content of the CTR block 1100. The modified version of the signal START, T_START, is generated in the T_START block 1110. The rest of the components (inverters 1120 and 1130, flip-flop 1140 and AND logic gate 1150) are used to generate the internal clock CLK_INT from the general clock CLK and with the aid of the signal T_START.

Figure 5:
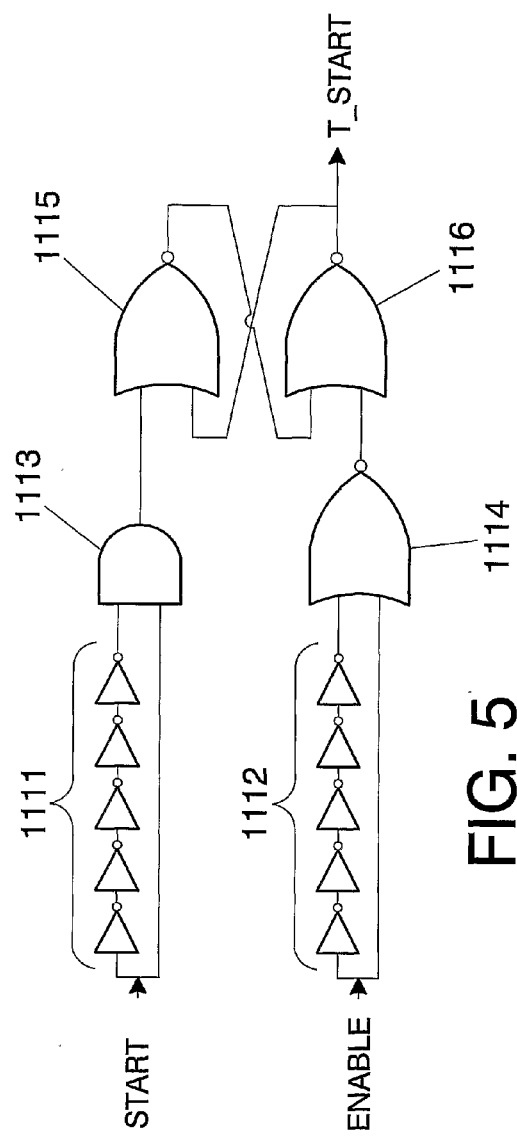
FIG. 5 depicts in detail one of the blocks of the "CTR" block of FIG. 4.

FIG. 5 shows the content of the T_START block 1110. This block generates the signal T_START from the input signals START and ENABLE and preferably comprises chains of five inverters 1111 and 1112, an AND logic gate 1113 and NOR logic gates 1114, 1115 and 1116.

Figure 6:
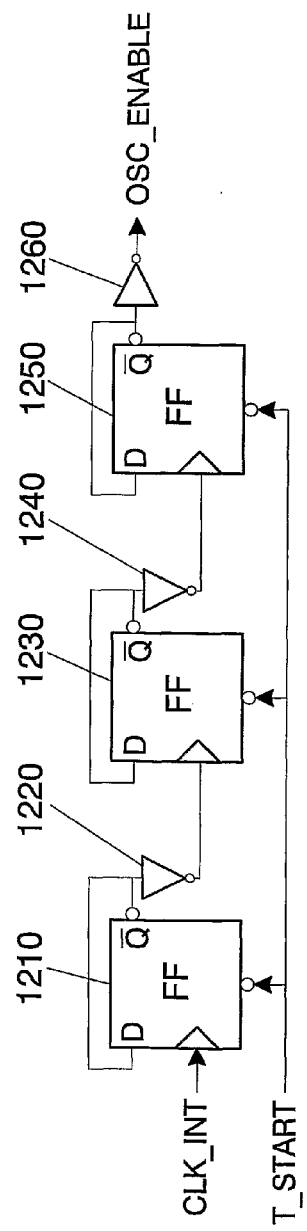
FIG. 6 depicts the block diagram of the next hierarchical level of the "OSC_START" block of the control logic.

FIG. 6 depicts the inside of the OSC_START block 1200. This block generates the control signal OSC_ENABLE for the temperature-dependent oscillator 2000 from the input signals CLK_INT and T_START. It preferably comprises flip-flops 1210, 1230 and 1250 and inverters 1220, 1240 and 1260.

Figure 7:
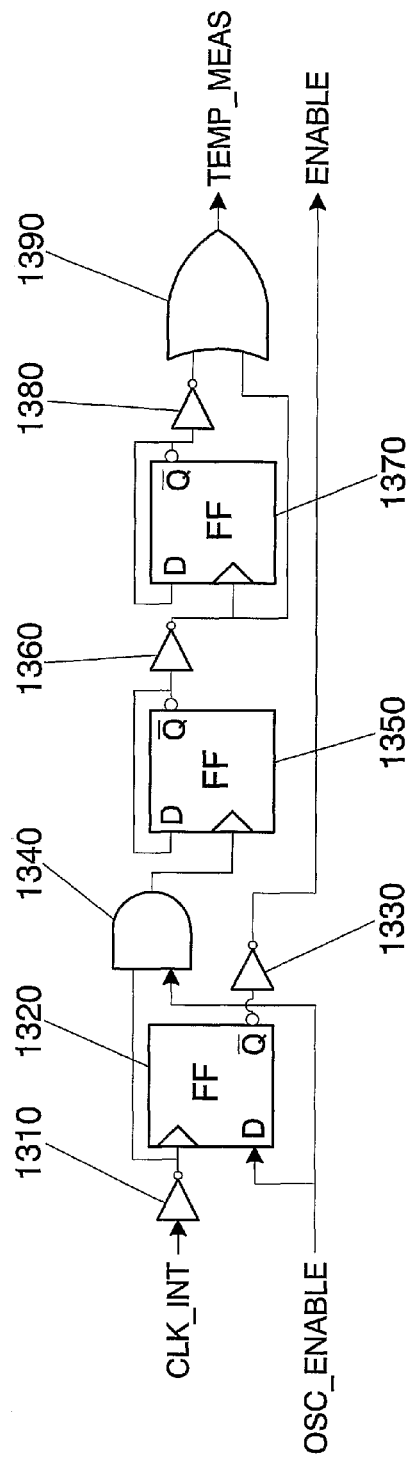
FIG. 7 depicts the block diagram of the next hierarchical level of the "TEMP_MEAS & ENABLE" block of the control logic.

FIG. 7 shows the content of the last TEMP_MEAS & ENABLE control block 1300. This block generates the control signal TEMP_MEAS necessary for the binary counter 3000 and the signal ENABLE required by both the binary counter 3000 and by the parallel-to-serial converter 4000 from the input signals CLK_INT and OSC_ENABLE. As can be seen in FIG. 7, the block 1300 preferably comprises inverters 1310, 1330, 1360 and 1380, flip-flops 1320, 1350 and 1370, an AND logic gate 1340 and an OR logic gate 1390.

Figure 8:
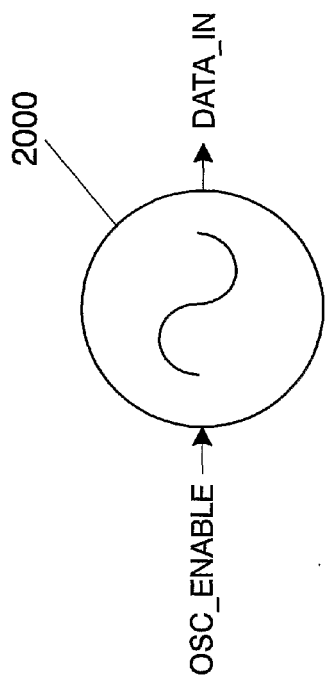
FIG. 8 depicts the block diagram of the highest hierarchical level of the temperature-dependent oscillator of the sensor according to one embodiment of the present invention.

FIG. 8 shows the oscillator 2000. This oscillator 2000, which is preferably a ring oscillator, is dependent on the temperature (T) to be measured. Its input OSC_ENABLE (generated by the control logic block 1000) controls the time during which the oscillator 2000 remains active. This signal OSC_ENABLE is independent of the temperature (T) to be measured. The output DATA_IN represents the pulse train the oscillation frequency of which is a function of the temperature. More specifically, this oscillation frequency is dependent on the delay introduced by the logic gates comprised in the oscillator 2000. The pulse train exists while the oscillator 2000 remains in an active state. In one embodiment of the present invention, this oscillator 2000 comprises a pulse generator, a power supply voltage activation/deactivation circuit for the rest of the components of the oscillator; a current source, preferably with a high PSRR (power supply rejection ratio) for supplying power to the pulse generator and a startup circuit for establishing the point of stable operation of the current source.

Figure 9:
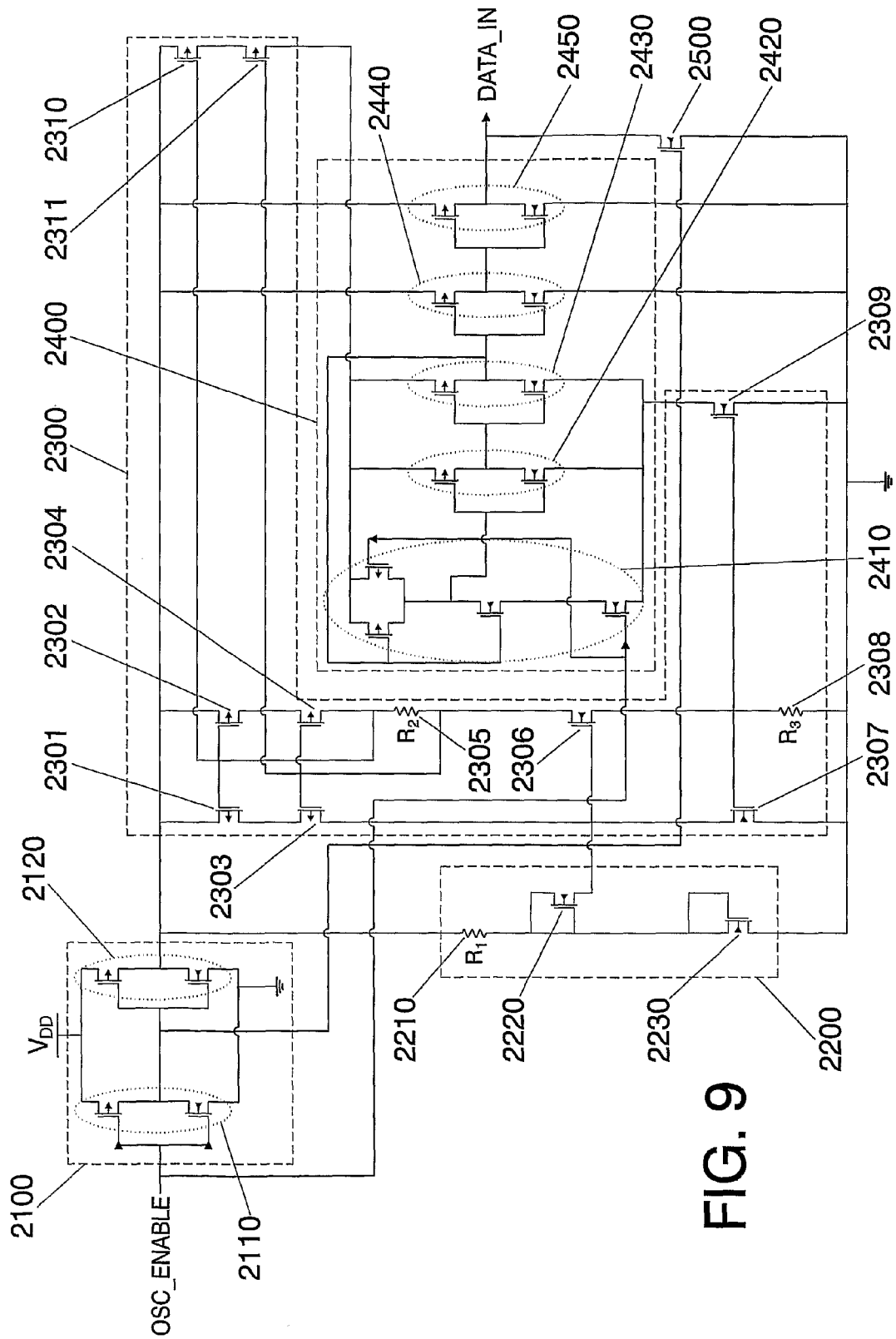
FIG. 9 depicts a diagram of the circuit of the temperature-dependent oscillator of FIG. 8, according to one embodiment of the present invention.

FIG. 9 shows one possible embodiment of the circuit of the oscillator 2000. The embodiment comprises four circuits: a first "$V_{DD}$ Enable" circuit 2100, a second "Startup" circuit 2200, a third "Cascoded Bootstrapped Current Source" circuit 2300 and a fourth "Pulse_Generator" circuit 2400. The objective of the circuit 2100 is to activate/deactivate the power supply voltage $V_{DD}$ for the rest of the circuits of the oscillator 2000, i.e., while the signal QSC_ENABLE remains in a '1' logic state, the two inverters 2110 and 2120 connect the power supply $V_{DD}$ with the output node of the circuit 2100. The consumption of the sensor 108 is thus reduced because the latter only consumes energy while the signal OSC_ENABLE is '1'. The circuit 2200 is used to establish a point of stable operation for the current source 2300 and, in one possible configuration, comprises a resistor R1 2210 and two NMOS transistors 2220 and 2230. A current source 2300 is used to supply power to the circuit 2400. This source is preferably designed to have a high PSRR (Power Supply Rejection Ratio). With this high PSRR, the oscillation generator circuit 2400 is made as independent as possible from fluctuations in the power supply voltage, since the fluctuations affect the generated oscillation frequency. The mentioned current source 2300 comprises, in one possible embodiment, PMOS transistors 2301, 2302, 2303, 2304, 2310 and 2311, NMOS transistors 2306, 2307 and 2309 and resistors R2 2305 and R3 2308. Finally, the pulse generator circuit 2400 preferably comprises an odd number of negated logic gates (NAND gate 2410 and inverters 2420, 2430, 2440 and 2450) in a closed loop which produces a pulse train at the output (DATA_IN), the oscillation frequency of which is a function of the delay introduced by the gates. When the temperature increases, the mobility of electrons and holes of the transistors forming the mentioned logic gates decreases. Therefore, the delays introduced thereby increase and the oscillation frequency generated decreases. An inversely linear relationship between the temperature and the oscillation frequency of the pulse train DATA_IN is thus achieved. An NMOS transistor 2500 allows maintaining the output DATA_IN in a '0' defined logic state when the signal OSC_ENABLE is '0' and therefore the oscillator 2000 is deactivated. In other words, according to FIG. 9, when OSC_ENABLE is '0' the gate-to-source voltage, $V_{GS}$, of the transistor 2500 is $V_{DD}$ and the transistor becomes saturated, connecting the node DATA_IN to ground (GND). In contrast, when OSC_ENABLE is '1' and the oscillator 2000 is therefore active, the voltage $V_{GS}$ of the transistor 2500 will be nil and the latter will be an open circuit, not interfering in any way in the output DATA_IN.

Figure 10:
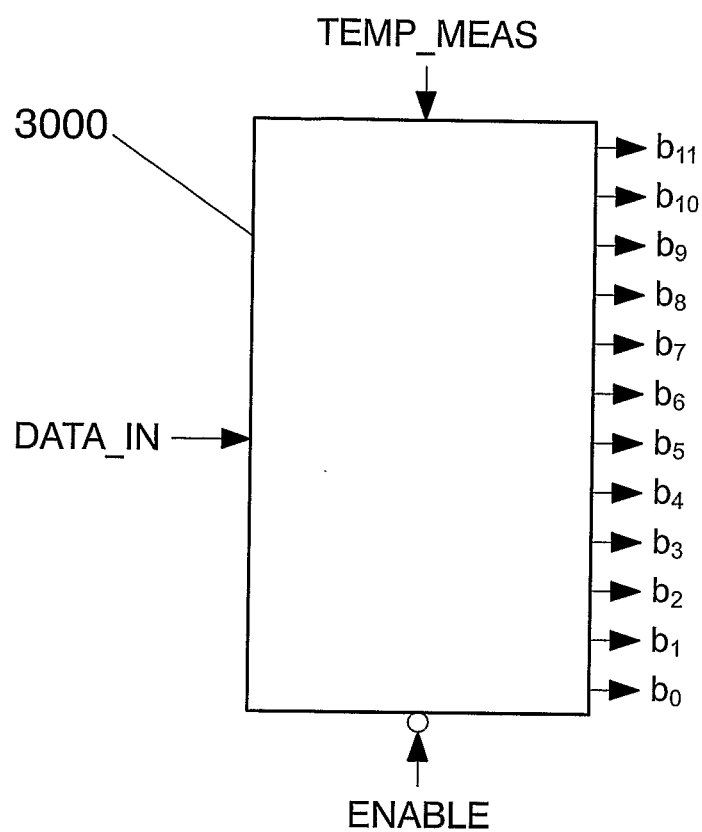
FIG. 10 depicts the block diagram of the highest hierarchical level of the binary counter of the sensor according to one embodiment of the present invention.

FIG. 10 shows the block binary counter 3000 with its inputs and outputs. The binary counter 3000 counts the number of pulses (contained in the pulse train delivered by the oscillator 2000) in a fixed time extracted from the clock signal of the sensor 108 which does not vary with the temperature. The binary counter 3000 takes the pulse train delivered by the oscillator 2000 in the input DATA_IN and counts its number of pulses in the fixed time independent of the temperature marked by the input TEMP_MEAS. When the temperature measurement process ends and the input signal ENABLE becomes '0', the counter 3000 is reset (its count is put to 0) and remains ready for the next measurement. A binary digital representation of the temperature measurement (T) is thus obtained. When the measurement process ends, the count, in its binary digital representation, of the counter 3000 is delivered in the output formed by the pins from the least significant bit to the most significant bit (digital word in parallel). In a particular embodiment, the number of pins is 12, therefore the most significant bit is "$b_{11}$" and the least significant bit is "$b_0$". The binary counter 3000 preferably comprises D-type flip-flops; D-type latches and inverting logic gates.

Figure 11:
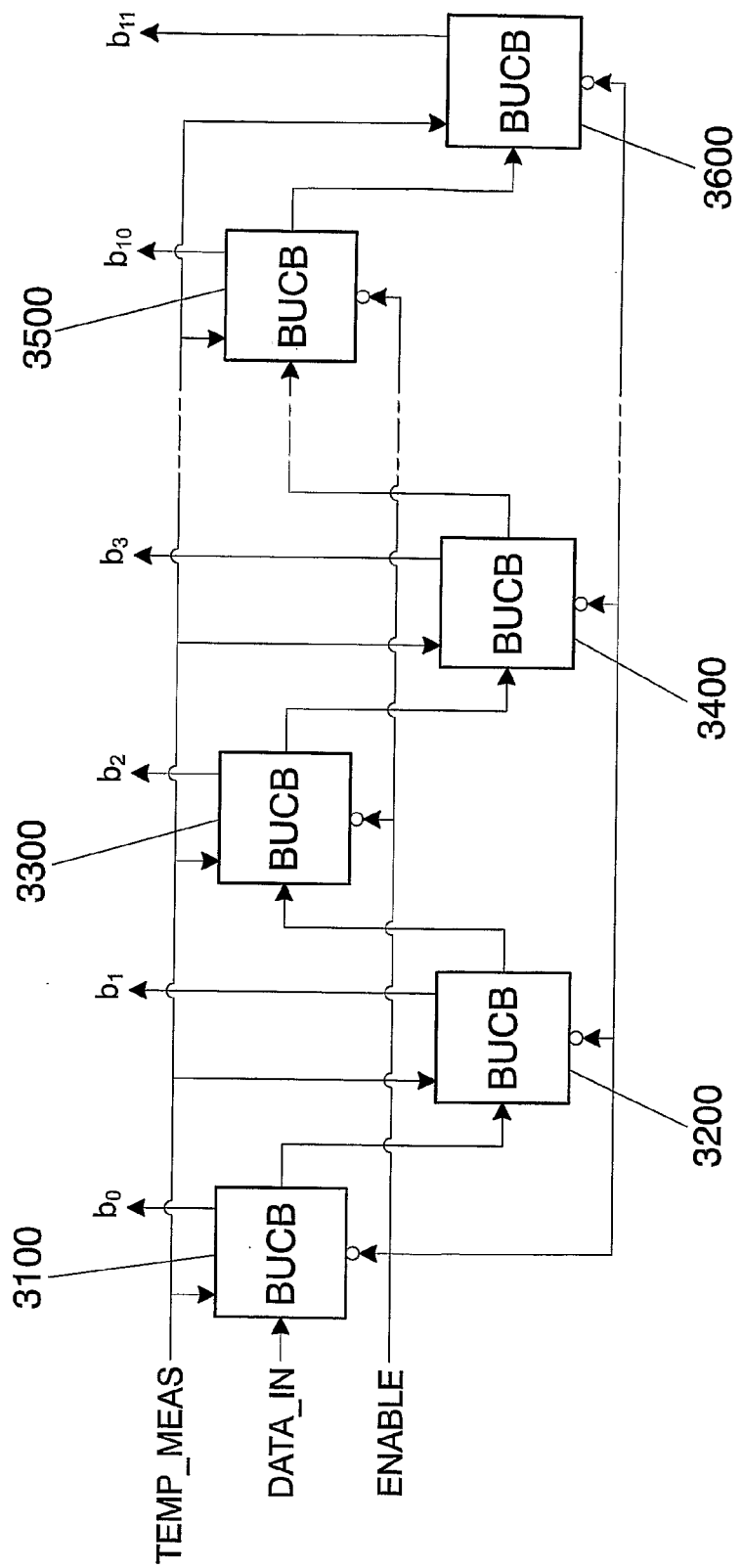
FIG. 11 depicts the block diagram of the next hierarchical level of the binary counter, comprising the "Unitary Block of the Binary Counter" blocks.

FIG. 11 shows one possible embodiment of the binary counter 3000. The latter comprises a plurality of identical BUCBs (Unitary Block of the Binary Counter) (depicted in FIG. 11 from 3100 to 3600). In a particular embodiment, the number of BUCBs is twelve. Each of these twelve blocks takes the signals TEMP_MEAS, ENABLE and the output of the previous block to deliver one of the twelve bits of the binary count as output.

Figure 12:
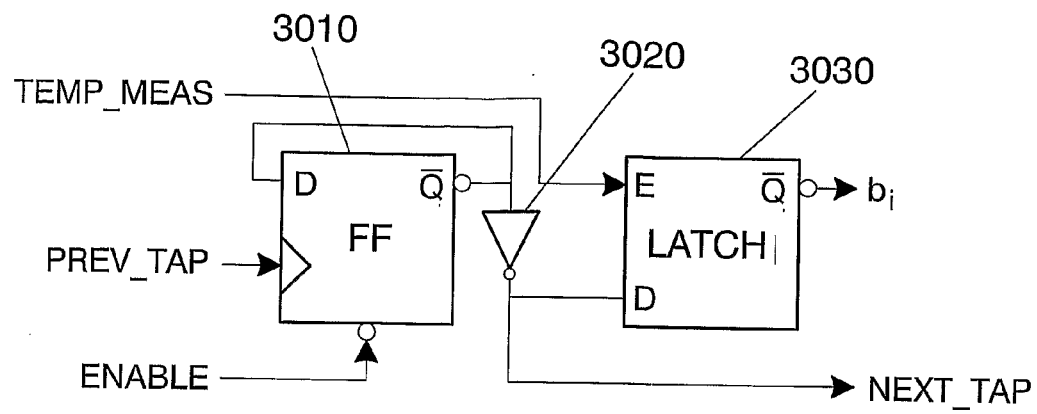
FIG. 12 depicts the block diagram of the next hierarchical level of each "Unitary Block of the Binary Counter" block.

FIG. 12 shows one possible embodiment of any of the 12 BUCB blocks. The latter preferably comprise a flip-flop 3010, an inverter 3020 and a latch 3030. As has been previously mentioned, the inputs are TEMP_MEAS, ENABLE and the output of the previous block (PREV_TAP), and the outputs are the i-th bit "$b_i$" and the input for the next block (NEXT_TAP).

Figure 13:
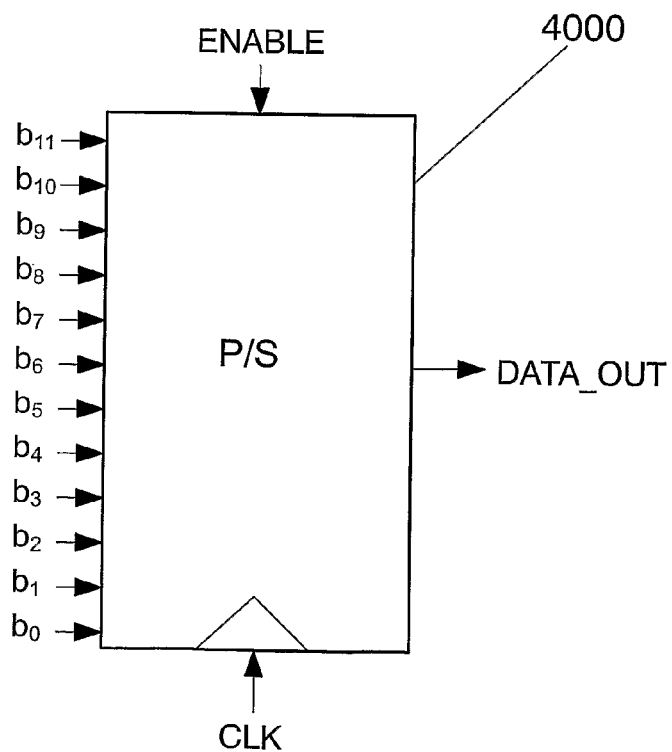
FIG. 13 depicts the block diagram of the highest hierarchical level of the parallel-to-serial converter of the sensor according to one embodiment of the present invention.

FIG. 13 depicts the parallel-to-serial converter 4000 with its inputs and outputs. The parallel-to-serial converter 4000 takes the word delivered in parallel by the binary counter 3000 and converts it into a serial word in as many consecutive cycles of the clock signal as bits contained in the parallel word (for example, 12). In other words, this block emits serially in the output DATA_OUT, at the pace imposed by the clock of the sensor CLK, the binary representation in parallel of the temperature measurement loaded in the inputs from "$b_{11}$" to "$b_0$". To correctly read the serial word of, for example, 12 bits in the output DATA_OUT, the "$b_i$" bits must start to be considered when the input signal ENABLE drops to '0', and after that instant a bit will be read in each clock cycle. Thus, in 12 consecutive cycles of clock CLK, the word of 12 bits is obtained ordered from the most significant bit ("$b_{11}$") to the least significant bit ("$b_0$"). Introducing a parallel-to-serial converter in the sensor 108 facilitates possible measurements and tests thereof since it has the relevant information for the measurement in a single output terminal. The parallel-to-serial converter 4000 preferably comprises D-type flip-flops; inverting logic gates; AND logic gates and OR logic gates. This serial word is stored in a register or memory, which can be volatile or non-volatile, for its subsequent use (for example, sending to a remote reader). This register or memory may form part of the actual sensor 108 or may not form a direct part thereof. In this case, the register or memory forms part of the transponder (as illustrated below).

Figure 14:
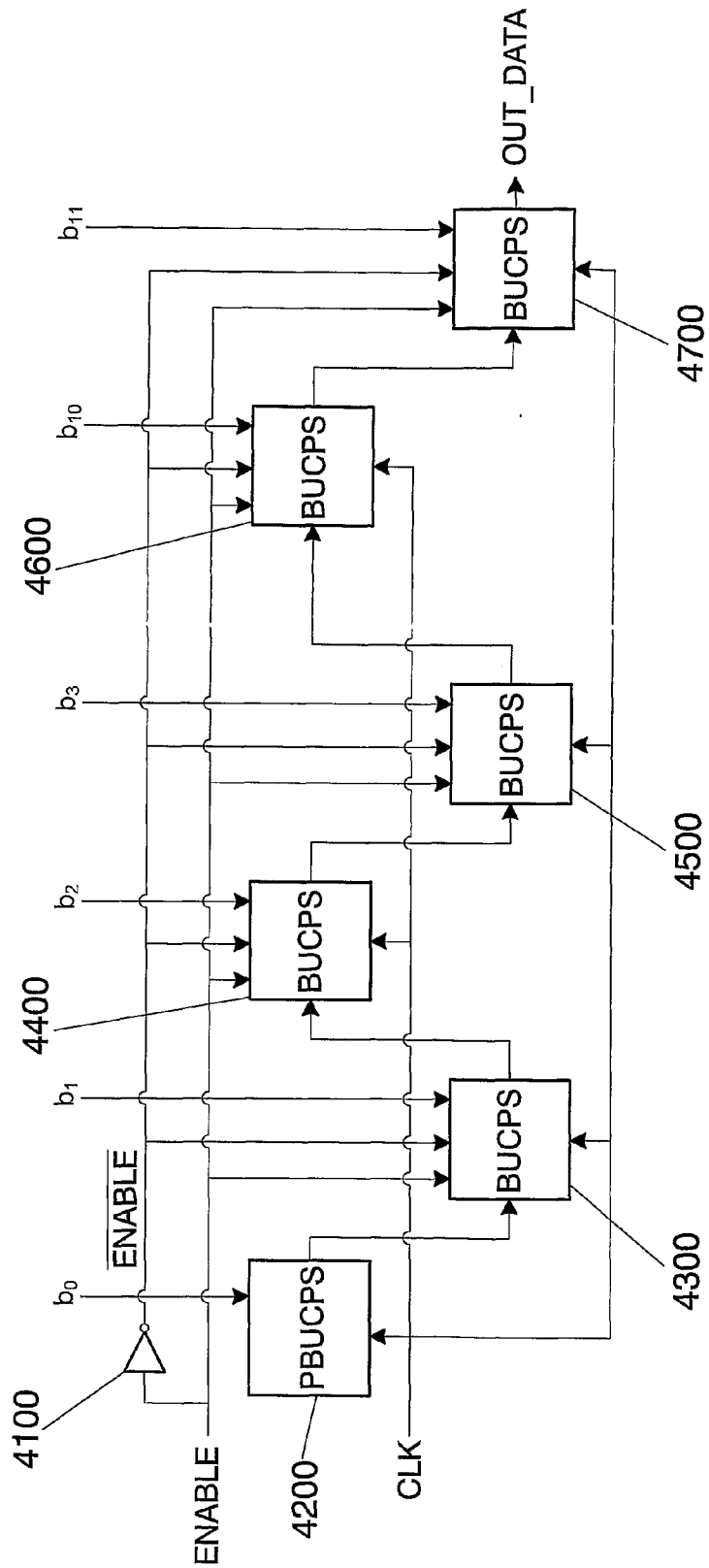
FIG. 14 depicts the block diagram of the next hierarchical level of the parallel-to-serial converter, comprising the PBUCPS (First Unitary Block of the Parallel-to-Serial Converter) and BUCPS (Unitary Block of the Parallel-to-Serial Converter) blocks.

FIG. 14 shows one possible embodiment of the parallel-to-serial converter 4000. The latter preferably comprises an inverter 4100, a PBUCPS (First Unitary Block of the Parallel-to-Serial Converter) block 4200 and the remaining eleven BUCPS (Unitary Block of the Parallel-to-Serial Converter) blocks depicted in FIG. 14 from 4300 to 4700. All the blocks, except the first one, take as an input the signals ENABLE, $\overline{\text{ENABLE}}$, CLK, the i-th bit "$b_i$" and the output of the previous block to generate as an output the input of the next block until the last one delivers the word OUT_DATA.

Figure 15:
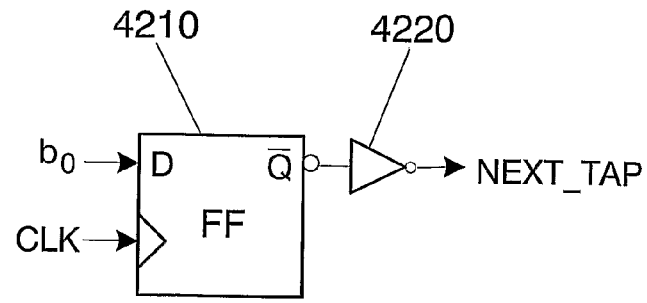
FIG. 15 depicts the block diagram of the next hierarchical level of the PBUCPS block.

FIG. 15 shows one possible embodiment of the PBUCPS block 4200, comprising a flip-flop 4210 and an inverter 4220. The clock signal CLK and the least significant bit "$b_0$" act as inputs. The only output is NEXT_TAP which is the input for the next BUCPS.

Figure 16:
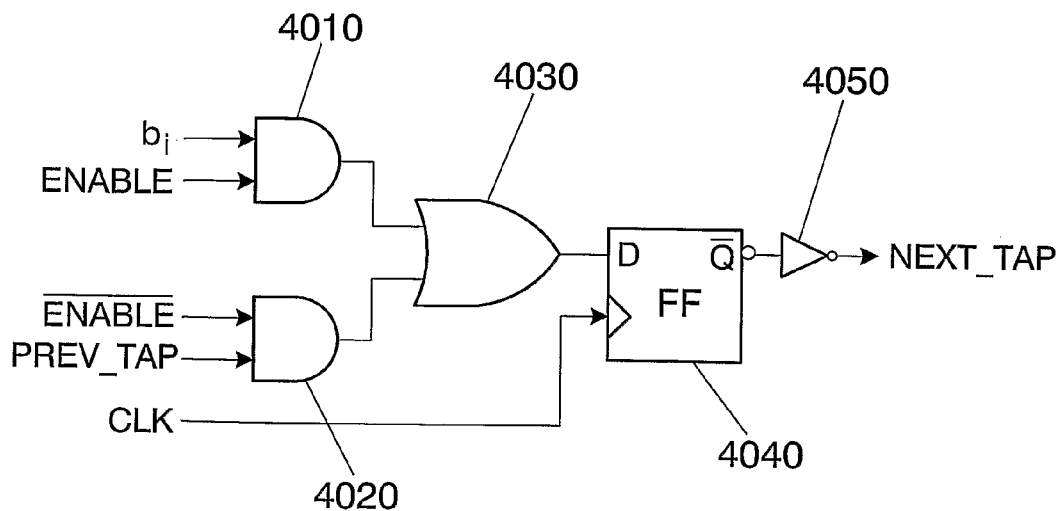
FIG. 16 depicts the block diagram of the next hierarchical level of the BUCPS block.

FIG. 16 shows one possible embodiment of the content of any of the eleven BUCPS blocks. These blocks comprise AND logic gates 4010 and 4020, an OR gate 4030, a flip-flop 4040 and an inverter 4050. As has been mentioned, each of these BUCPSs generates the output NEXT_TAP which is the input of the next block until the last one delivers in its output NEXT_TAP the final representation of the measurement DATA_OUT.

The sensor 108 which has been described is manufactured on a substrate which is preferably chosen from among: silicon, silicon on insulator (SOI), silicon-germanium, indium phosphide and gallium arsenide.

In relation to FIGS. 17 and 18, one possible embodiment of a temperature measurement system is detailed below, which comprises a transponder 101 which in turn comprises an integrated temperature sensor 108 according to the present invention. The temperature measurement system further comprises at least one reader 100.

Figure 17:
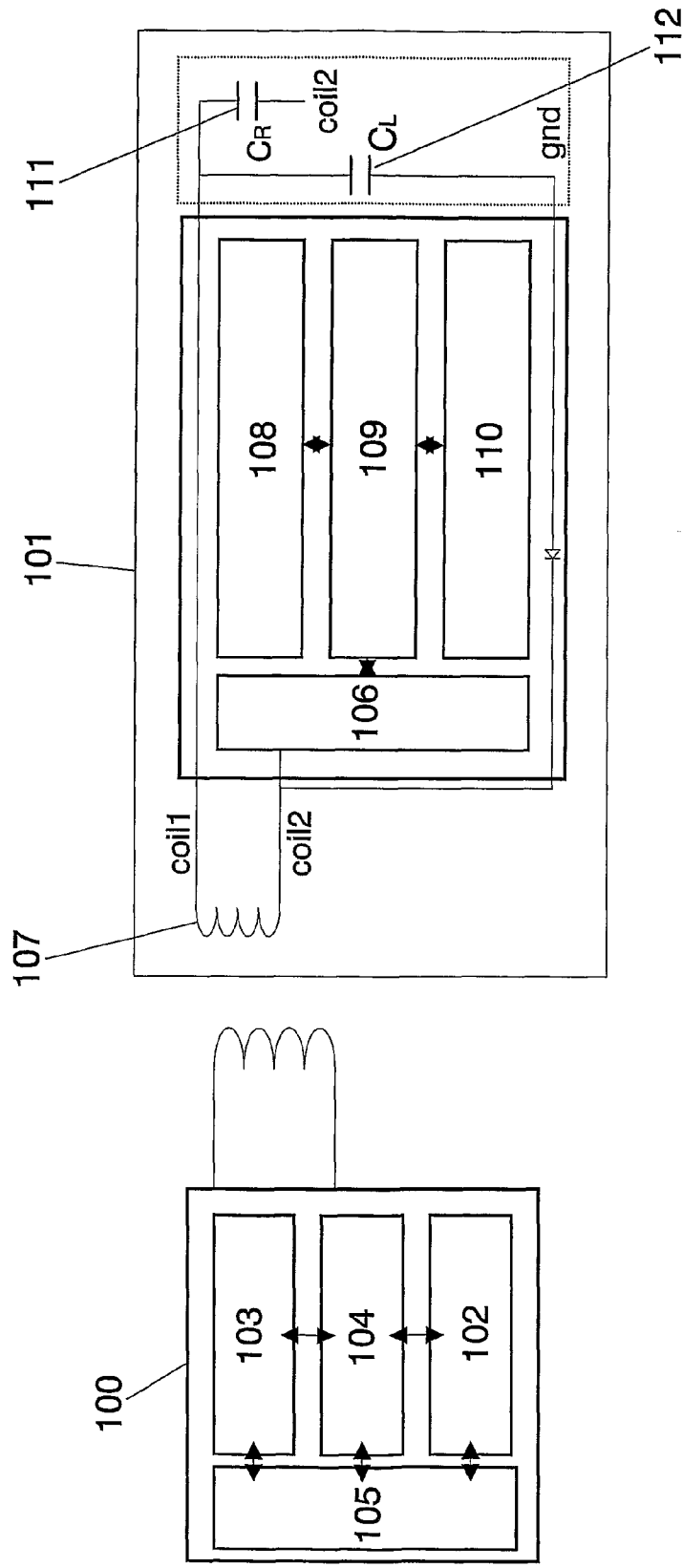
FIG. 17 shows a reader and a transponder for temperature measurement comprising a sensor according to one embodiment of the present invention.
Figure 18:
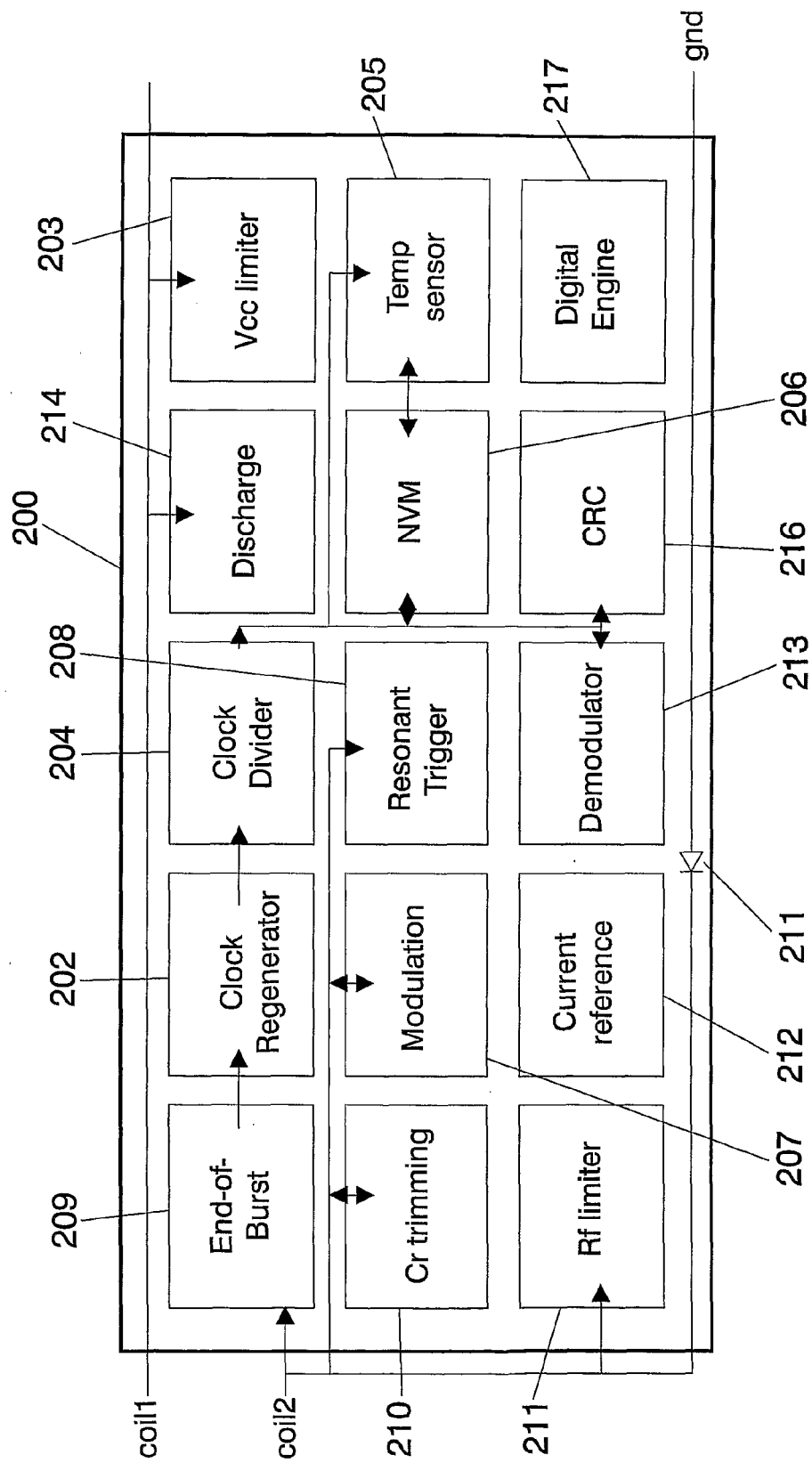
FIG. 18 illustrates the operation of the transponder 101 of FIG. 17 according to one embodiment of the present invention.

Nevertheless, the integrated temperature sensor 108 of the present invention can form part of different transponders 101 or temperature measurement systems, without having to be limited to the format, technology and/or implementation of FIGS. 17 and 18.

FIG. 17 shows one possible embodiment of a temperature measurement system, comprising a reader 100 and a transponder 101 for temperature measurement.

The reader 100 can be any conventional reader of those used in transponder reading systems, such as wireless RFID (radio frequency identifiers) systems, and is therefore not an object by itself of the present invention. An example of a reader 100, which must not be considered as limiting but rather as a mere illustrative example, comprises a display 102, acting as an interface with the user, a radio frequency subsystem 103 connected to at least one antenna operating as an emitter-receiver of the information exchanged with the transponder 101, a block 104 for the digital processing of the information and a temperature-stable clock 105. In one possible embodiment, this clock 105 can be based on a quartz crystal. This clock 105 can optionally comprise some type of temperature stabilization correction. In a normal operation mode, the reader 100 emits a radio frequency signal in a certain band (for example, 134.2 kHz or 125 kHz for animal identification, but any another frequency band used by conventional readers and transponders can be used).

Thus, the transponder 101 receives this energy (signal) through at least one antenna 107 and processes it internally to obtain its own operating energy. This energy is processed by means of a radio frequency front-end or radio frequency subsystem 106, in charge of receiving the signal by means of one or several antennas 107, subsequently rectifying the signal (FIG. 18) until having a direct voltage supplying power momentarily to the operation of the transponder 101. This same antenna or antennas 107 subsequently receive the emission of the transponder 101, treating it in a manner similar to the radio frequency subsystem or emission-reception system 103 of the reader 100, such that the information necessary to be processed by the block 104 of the reader 100 can be extracted. The information received, whether it is a passive identification of the transponder 101 or the reading of the sensor 108, is shown on the display 102 of the reader 100, such that it can be easily seen by the user.

The transponder 101 can be any conventional transponder of those used in wireless systems, such as wireless RFID (radio frequency identifiers) systems. Thus, the transponder 101 comprises at least: means 110 for storing a unique identification code for the transponder 101; an antenna 107 which can receive a temperature request signal from a reader 100, 6000 and transmit to the reader 100, 6000 a signal (DATA_OUT, DATA_OUT@T) representing the measured temperature (T); and an integrated temperature sensor 108 according to the present invention.

The transponder 101 preferably further comprises means for extracting, from a temperature request signal from a reader 101, 6000, a reference signal (CLK) independent of the temperature to be measured in order to be used by the control means (1000) of the sensor 108 to coordinate the rest of the means (2000, 3000, 4000).

The transponder 101 further comprises means 5000 for storing the serial digital signal (DATA_OUT, DATA_OUT@T) representing the measured temperature (T). These means 5000 may or may not be the same as those means 110 for storing a unique identification code for the transponder 101.

The transponder 101 can further comprise means 5000 for storing a reference digital signal (DATA_OUT@$T_{REF}$) representing a reference temperature ($T_{REF}$). In this case, the antenna (107) can transmit, together with the digital signal (DATA_OUT, DATA_OUT@T) representing the measured temperature (T), the reference digital signal (DATA_OUT@$T_{REF}$). The means can also be the same as those means 110 for storing a unique identification code for the transponder 101, or other different means, and can also be the same means 5000 for storing the serial digital signal (DATA_OUT, DATA_OUT@T) representing the measured temperature (T).

The transponder 101 of FIG. 17 comprises one or several reception-emission antennas 107, an analog emission-reception system 106, in charge of handling the energy emitted by the reader 100 and of emitting the information back to the reader 100; an integrated temperature sensor 108 object of the present invention; an information processing block 109 in charge of managing internal information; a memory block or information storage system 110; a load capacitance 112 for storing energy and a resonance capacitance 111 forming, together with the coil, a resonant tank operating as an antenna 107. These capacitances can be integrated or external. The memory block or information storage system 110 is preferably non-volatile 110, of the EEPROM, EPROM, OTP type or any other permanent memory system in the absence of power supply.

Furthermore, the transponder 101 is preferably an integrated radio frequency transponder. Its dimensions depend on the integration technology used, preferably between 1 and 2 mm$^2$ approximately, as well as on the level of integration carried out, since it is possible to integrate or not to integrate various storage and resonance capacitances.

FIG. 18 illustrates the operation of the transponder 101 according to one possible embodiment of the present invention. The transponder 101, when interrogated by the reader 100, receives the energy emitted by the latter by means of the antenna, limiting the incident signal in amplitude by means of the diode 201. The incident wave from the reader 100 has a certain and temperature-stable frequency since it is based on a stable reference 105 of the reader 100. This stable incident frequency is extracted in the transponder 101 by a clock regenerator block 202 in charge of obtaining a clock signal which will be used by the transponder system 101, after having reduced its frequency by means of a clock divider block 204. The incident energy of the reader 100 gradually charges the load capacitance 112 (FIG. 17) up to a maximum value controlled by the energy limiter block 203. The recovered wave of clock CLK is used as an input of the temperature sensor block 205. The obtained temperature result is stored in a (volatile or non-volatile) memory block 206, 110 while waiting to be emitted with the message back to the reader 100. When, according to the protocol by which the system is governed, the transponder 101 must emit the message back to the reader 100, the information collected from the "temperature sensor" block 205 and stored in the memory 206, 110 is modulated according to the protocol defined by the modulator 207 on a return radio frequency signal, based on the incident signal, which has remained active as a result of the trigger block 208.

FIG. 17 also depicts a wireless temperature identification system according to one possible embodiment of the present invention. The system of FIG. 17 comprises: at least one reader (100) which is capable of transmitting a temperature request signal through an antenna and receive through the antenna a signal (DATA_OUT, DATA_OUT@T) representing a measured temperature (T) and at least one transponder (101) according to the present invention.

This wireless temperature identification system is preferably a radio frequency identification (RFID) system.

The object of the present invention is also a temperature measurement method comprising the following steps: generating (2000) a pulse train (DATA_IN) at a certain oscillation frequency; counting (3000) the number of pulses of the pulse train (DATA_IN) during a fixed time independent of the temperature to be measured (T) and generating a plurality of bits ($b_{11}$, $b_{10}$, . . . , $b_0$) indicating the number of pulses comprised in the pulse train (DATA_IN); generating (4000) a serial digital signal (DATA_OUT, DATA_OUT@T) from the plurality of bits ($b_{11}$, $b_{10}$, . . . , $b_0$); wherein the pulse train (DATA_IN) is generated by means of an oscillator comprising a plurality of logic gates (2410, 2420, 2430, 2440, 2450) which are capable of introducing a delay dependent on the temperature to be measured (T), the oscillation frequency of the pulse train (DATA_IN) being dependent on the temperature to be measured (T).

The method preferably comprises the step of controlling (1000) the previous steps (2000, 3000, 4000) from at least one reference signal (CLK) independent of the temperature to be measured (T).

Furthermore, the delay dependent on the temperature which is introduced by the logic gates (2410, 2420, 2430, 2440, 2450) is due to the fact that when the temperature increases, the mobility of electrons and holes of the transistors forming the logic gates decreases, whereas when the temperature decreases, the mobility increases.

The method further comprises the steps of: before generating the pulse train (DATA_IN), receiving a temperature request from a remote reader (100); after generating a serial digital signal (DATA_OUT, DATA_OUT@T), storing the signal (DATA_OUT, DATA_OUT@T) in a memory register (110) and transmitting the signal (DATA_OUT, DATA_OUT@T) to a remote reader (100) through free space.

The sensor, transponder and system of the present invention have a series of advantages with respect to known temperature detection systems, such as:

The transponder integrating the sensor of the present invention has an integration area that is considerably smaller than the transponders of the state of the art. Given that the oscillator of the sensor is designed from several logic gates and that the associated logic is completely digital, the final result of the area used for the integration has reduced dimensions compared to other systems based on analog-to-digital conversion blocks.

Furthermore, the fact of integrating such a small device based on digital gates makes the consumption of the device essentially lower than that of known systems. This fact is very important in the field of transponders, since the absence of batteries or other external power supply systems prevents bottlenecks in the overall operation of the system.

Additionally, from the point of view of design, the sensor, transponder and system of the present invention have a greater simplicity compared to the complications derived from the design of analog-to-digital converters.

Figure 19:
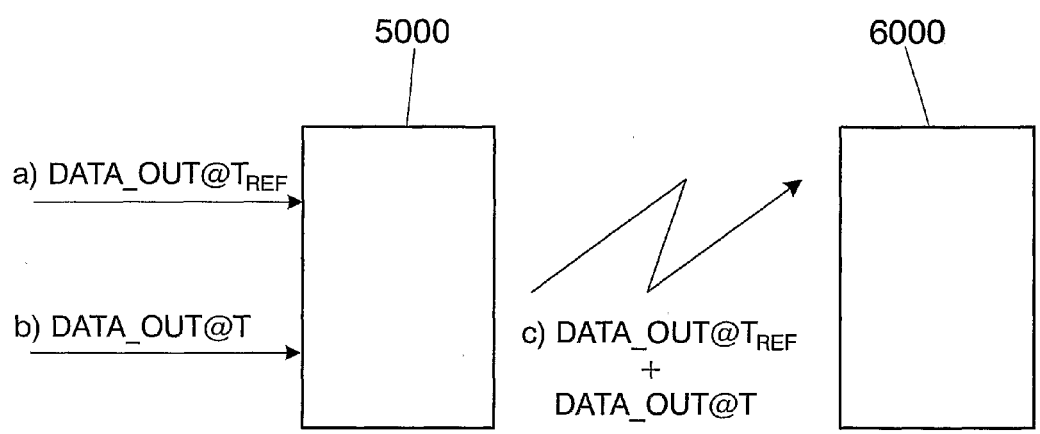
FIG. 19 depicts the process of calibrating and sending the value together with the temperature measurement to a reader by wireless means according to one embodiment of the present invention.

Finally, FIG. 19 depicts a calibration method for the sensor 108 of the present invention. This method comprises the steps of:

a) Performing once the temperature measurement method or process in which the temperature to be measured is a defined and known reference temperature ($T_{REF}$) and obtaining in the output DATA_OUT its digital representation in a certain number of bits, for example, 12 bits (DATA_OUT@$T_{REF}$).

b) Saving this obtained reference digital signal or word (DATA_OUT@$T_{REF}$) of, for example, 12 bits in a volatile or non-volatile memory or register 110, 5000 of a transponder 101;

c) Performing the same process with the temperature (T) to be measured, resulting in a word (DATA_OUT@T) which is also stored in a part of the same or in another memory register 110, 5000;

d) Finally, sending both digital representations (DATA_OUT@$T_{REF}$, DATA_OUT@T) to a reader 100, 6000 by means of a wireless interface (free space).

After that, the reader 100, 6000 has a reference value (DATA_OUT@$T_{REF}$) to compare and thus deduce the measured temperature of the future words DATA_OUT@T that it will receive. In this way, the entire computational burden is left for the reader 100, 6000, thus simplifying the microprocessor of the transponder.

The transponder 101 of this system is designed to be used in many possible applications:

- temperature measurement in living beings, by means of implanting a passive transponder in a living being, for example, in an animal, to measure its body temperature. This is achieved by means of implanting a transponder 101 in an animal, for example, but not in a limiting manner, injected under the skin, by means of tagging systems piercing cartilage or internally implanted with additional packagings—ceramic, plastic packagings—deposited in internal organs;
- temperature measurement in closed environments, such as buildings, by means of passive transponders;
- temperature measurement in food packagings, by means of transponders encased in the corresponding package;
- any other application involving temperature measurement and its reading by means of an external device connected by radio frequency.

In view of this description and set of drawings, the person skilled in the art will be able to understand that the invention has been described according to several preferred embodiments thereof, but that many variations can be introduced in the preferred embodiments without departing from the object of the invention as it has been claimed.

The invention claimed is:

1. Integrated temperature sensor comprising:
    means for generating a pulse train DATA_IN at a certain oscillation frequency;
    means for counting the number of pulses of said pulse train DATA_IN during a fixed time independent of a temperature to be measured T and for generating a plurality of bits $b_{11}$, $b_{10}$, ..., $b_0$; indicating the number of pulses comprised in the pulse train DATA_IN;
    means for generating a serial digital signal DATA_OUT DATA_OUT@T from said plurality of bits $b_{11}$, $b_{10}$, ..., $b_0$;
    wherein the means for generating a pulse train DATA_IN comprise a plurality of logic gates configured for introducing a delay dependent on the temperature to be measured T wherein the means for generating a pulse train DATA_IN generates a pulse train DATA_IN the oscillation frequency of which is dependent on the temperature to be measured T, wherein the sensor further comprises control means for coordinating the means for generating a pulse train, the means for counting the number of pulses of the pulse train and for generating a plurality of bits and the means for generating a serial digital signal from at least one reference signal CLK independent of temperature to be measured T, said reference signal CLK being an input for said means for generating a serial digital signal, and said control means having as output a signal ENABLE, said signal ENABLE being an input for said means for generating a pulse train and for said means for counting the number of pulses of the pulse train and for generating a plurality of bits.

2. Sensor according to claim 1, wherein the means for generating a pulse train generate said pulse train DATA_IN from a reference signal OSC_ENABLE independent of the temperature to be measured.

3. Sensor according to claim 1, wherein the means for generating a pulse train DATA_IN are a ring oscillator.

4. Sensor according to claim 1, wherein the means for generating a pulse train DATA_IN are a ring comprise:
    a power supply voltage activation and deactivation circuit,
    a current source,
    a startup circuit for the current source;
    a pulse generator.

5. Sensor according to claim 4, wherein the current source comprises means for protecting the pulse generator against variations of the supply voltage $V_{DD}$.

6. Sensor according to claim 1, wherein the plurality of logic gates comprises an odd number of negated logic gates.

7. Sensor according to claim 1, wherein the delay dependent on the temperature which is introduced by the logic gates is due to the fact that when the temperature increases, the mobility of electrons and holes of the transistors forming said logic gates decreases, whereas when the temperature decreases, said mobility increases.

8. Sensor according to claim 1, wherein the means for generating a serial digital signal DATA_OUT DATA_OUT@T from a plurality of bits $b_{11}$, $b_{10}$, ..., $b_0$, comprises a parallel-to-serial converter for converting the plurality of bits $b_{11}$, $b_{10}$, ..., $b_0$, into a serial digital signal DATA_OUT DATA_OUT@T.

9. Sensor according to claim 1, wherein the control means coordinate the means for generating a pulse train, the means for counting the number of pulses of the pulse train and for generating a plurality of bits and the means for generating a serial digital signal from a second signal, the signal being of an initialization signal, START.

10. Sensor according to claim 1, wherein the sensor is manufactured on a substrate which is chosen from among: silicon, silicon on insulator, SOI, silicon-germanium, indium phosphide and gallium arsenide.

11. Transponder for a wireless temperature identification comprising:
    means for storing a unique identification code for said transponder;
    an antenna configured for receiving a temperature request signal from a reader and transmitting to that reader a signal DATA_OUT DATA_OUT@T representing the measured temperature T;
    a radio frequency front-end for receiving and processing said temperature request signal from the antenna and for providing said antenna with a signal DATA_OUT DATA_OUT@T representing the measured temperature T;
    wherein the transponder further includes an integrated temperature sensor according to claim 1, and further including means for extracting, from a temperature request signal from a reader, a reference signal CLK independent of the temperature to be measured T to be used by control means to coordinate the means for generating a pulse train, the means for counting the number of pulses of the pulse train and for generating a plurality of bits and the means for generating a serial digital signal of the sensor, said reference signal CLK being an input for said means for generating a serial digital signal, and said control means having as output a signal ENABLE, said signal ENABLE being an input for said means for generating a pulse train and for said means for counting the number of pulses of the pulse train and for generating a plurality of bits.

12. Transponder according to claim 11, wherein the transponder further comprising means for storing the serial digital signal DATA_OUT DATA_OUT@T representing the measured temperature T.

13. Transponder according to claim 11, wherein the transponder further comprises means for storing a reference digital signal DATA_OUT@TREF representing a reference temperature TREF.

14. Transponder according to claim 13, wherein the antenna is configured for transmitting, together with the digital signal DATA_OUT DATA_OUT@T representing the measured temperature T the reference digital signal DATA_OUT @TREF.

15. Transponder according to claim 11, wherein the transponder is an integrated radio frequency transponder.

16. Wireless temperature identification system comprising:
at least one reader which can transmit a temperature request signal through an antenna and receive through the antenna a signal DATA_OUT DATA OUT@T representing a measured temperature T;
characterized by comprising at least one transponder according to claim 11, said transponder configured for receiving said temperature request signal from said reader and for transmitting a signal DATA_OUT DATA_OUT@T representing a measured temperature T to the reader.

17. System according to claim 16, wherein the system is a radio frequency identification RFID system.

18. System according to claim 16, wherein the transponder is designed to be implanted in an animal to measure its body temperature.

19. Temperature measurement method comprising the following steps:
generate a pulse train DATA_IN at a certain oscillation frequency;
counting the number of pulses of the pulse train DATA_IN during a fixed time independent of the temperature to be measured T and generating a plurality of bits $b_{11}$, $b_{10}, \ldots, b_0$ indicating the number of pulses comprised in the pulse train DATA_IN;
generating a serial digital signal DATA_OUT DATA_OUT@T from the plurality of bits $b_{11}, b_{10}, \ldots, b_0$;
wherein the pulse train DATA_IN is generated by means of an oscillator comprising a plurality of logic gates configured for introducing a delay dependent on the temperature to be measured T the oscillation frequency of the pulse train DATA_IN being dependent on the temperature to be measured T controlling the step of generating a pulse train DATA_IN, the step of counting the number of pulses of the pulse train and generating a plurality of bits, and the step of generating a serial digital signal from at least one reference signal CLK independent of the temperature to be measured T, said reference signal CLK being an input for said step of generating a serial digital signal, and said step of controlling the step of counting the number of pulses of the pulse train and generating a plurality of bits, and the steps of generating a serial digital signal being performed by means of a signal ENABLE, said signal ENABLE being an input for said step of generating a pulse train and for said step of counting the number of pulses of the pulse train and for generating a plurality of bits.

20. Method according to claim 19, wherein the step of generating a pulse train DATA_IN is further defined by the delay dependent on the temperature which is introduced by the logic gates is due to the fact that when the temperature increases, mobility of electrons and holes of the transistors forming said logic gates decreases, whereas when the temperature decreases, said mobility increases.

21. Method according to claim 19, wherein the method further comprises the steps of:
before generating said pulse train DATA_IN receiving a temperature request from a remote reader;
after generating a serial digital signal DATA_OUT DATA_OUT@T storing the signal DATA_OUT DATA_OUT@T in a memory register and wirelessly transmitting the signal DATA_OUT DATA_OUT@T to the remote reader.

\* \* \* \* \*